US008942163B2

(12) United States Patent
Altshuller et al.

(10) Patent No.: US 8,942,163 B2
(45) Date of Patent: Jan. 27, 2015

(54) WIRELESS COMMUNICATIONS NETWORK BASE STATION EXTENSION

(75) Inventors: Mark Altshuller, Ganot Hadar (IL); Oleg Marinchenco, Modiln (IL); Leonid Shousterman, Alfei-Menashe (IL)

(73) Assignee: Sparkmotion Inc., Ottawa, Ontario (CA)

( * ) Notice: Subject to any disclaimer, the term of this patent is extended or adjusted under 35 U.S.C. 154(b) by 909 days.

(21) Appl. No.: 12/252,378

(22) Filed: Oct. 16, 2008

(65) Prior Publication Data
US 2009/0103492 A1    Apr. 23, 2009

Related U.S. Application Data

(60) Provisional application No. 60/960,902, filed on Oct. 19, 2007.

(51) Int. Cl.
*H04W 4/00* (2009.01)
*H04W 16/26* (2009.01)
*H04W 84/04* (2009.01)

(52) U.S. Cl.
CPC ............ *H04W 16/26* (2013.01); *H04W 84/047* (2013.01)
USPC ........................................................ 370/328

(58) Field of Classification Search
None
See application file for complete search history.

(56) References Cited

U.S. PATENT DOCUMENTS

| 7,689,228 | B2 * | 3/2010 | Labedz | 455/452.1 |
| 2002/0077151 | A1 * | 6/2002 | Matthews et al. | 455/561 |
| 2004/0005897 | A1 * | 1/2004 | Tomoe et al. | 455/450 |
| 2004/0062214 | A1 | 4/2004 | Schnack et al. | |
| 2008/0090575 | A1 * | 4/2008 | Barak et al. | 455/444 |

FOREIGN PATENT DOCUMENTS

| CN | 101014183 | 8/2007 |
| WO | WO 2009/050659 | 4/2009 |

OTHER PUBLICATIONS

Communication Pursuant to Article 94(3) EPC Dated Mar. 7, 2011 From the European Patent Office Re. Application No. 08839691.6.
Communication Relating to the Results of the Partial International Search Dated May 6, 2009 From the Intenational Searching Authority Re.: Application No. PCT/IB2008/054245.
International Search Report Dated Aug. 6, 2009 From the International Searching Authority Re.: Application No. PCT/IB2008/054245.
Written Opinion Dated Aug. 6, 2009 From the International Searching Authority Re.: Application No. PCT/IB2008/054245.
Abdulkareem et al. Description of Identified New Relay Based Radio Network Deployment Concepts and First Assessment by Comparison Against Benchmarks of Well Known Deployment Concepts Using Enhanced Radio Interface Technologies, WINNER [Online], No. IST-2003-507581, XP002522415, 13 P., Nov. 2, 2004. Retrieved Form the Internet.

(Continued)

*Primary Examiner* — Anh-Vu Ly
(74) *Attorney, Agent, or Firm* — Procopio, Cory, Hargreaves & Savitch LLP

(57) ABSTRACT

Apparatus and methods to permit the deployment of wireless base stations, where a deployed remote base station is backhauled to the core network over a wireless connection to an operatively attached donor base station using protocols that encapsulate backhaul communications within standard subscriber communication protocols.

4 Claims, 8 Drawing Sheets

(56) References Cited

OTHER PUBLICATIONS

Shen et al. "MS Handover Support in Transparent / Non-Transparent Relay Mode", IEEE802.16j Mobile Multihop Relay Task Group, Alcatel-Lucent, Research & Innovation, XP002522417, p. 0-6, Jan. 8, 2007. Retrieved From the Internet.

Tao et al. "Relay Tunnel Connection for 802.16j", IEEE 802.16j Mobile Multihop Relay Task Group, Mitsubishi Electric Research Lab, XP002522416, p. 1-7, Jan. 16, 2007. Retrieved From the Internet.

International Preliminary Report on Patentability Dated Apr. 29 2010 From the International Bureau of WIPO Re.: Application No. PCT/IB2008/054245.

Translation of Office Action Dated Sep. 28, 2012 From the State Intellectual Property Office of the People's Republic of China Re. Application No. 200880121703.2.

Translation of Search Report Dated Sep. 28, 2012 From the State Intellectual Property Office of the People's Republic of China Re. Application No. 200880121703.2.

* cited by examiner

WIRELESS COMMUNICATIONS NETWORK BASE STATION EXTENSION

RELATED APPLICATIONS

This application claims priority from U.S. Provisional Patent Application No. 60/960,902, filed on Oct. 19, 2007, by Altshuller et al.

FIELD AND BACKGROUND OF THE INVENTION

The present invention relates to managed wireless communication networks, and more particularly, but not exclusively to WiMAX networks.

A number of standards have been developed in recent years for providing wireless network access. These include such standards as the IEEE 802.16 family (i.e., WirelessMAN, also known as WiMAX), HIPERMAN, WiBro, CDMA family (including 3GPP2 for CDMA2000), GSM family (including 3GPP for GSM) and 3GPP systems generally. These networks provide connectivity through the deployment of Base Stations (CBS). Each BS contains the equipment necessary to provide wireless radio communication according to the BS's supported standards. Typically, this includes an antenna and two-way radio transmission equipment.

The BS provides radio coverage of a geographic area to provide communication services to client devices. A client device is known as a Subscriber Station (SS). The SS may be either fixed or mobile and communicates via radio frequencies with the BS. A mobile SS is often called a mobile subscriber (MS) for short.

As an essential part of its operation, the BS provides backhauling to the network. In the context of this disclosure, "backhauling" refers to: (1) the physical connection between a base station and a core network (such as the Internet), and (2) the bi-directional transmission of traffic (signaling and data) from the core network to the base station and vice versa over the physical connection. Furthermore, "backhaul communications" refers to the network interface, and communications thereon, between a base station and a core network (e.g., in WiMAX, interface and communications defined by R6 and R8). "Backhaul" and "backhauling" are sometimes abbreviated as "BH."

The traffic from and to the base station relative to the core network may include both traffic for or from a base station and traffic for or from subscriber stations subscribed (i.e., connected) to the base station.

It should be noted that the term "core network," as used in this disclosure, refers to any network to which a base station is connected via a backhaul link. When necessary, other components of the rest of the network, such as a gateway, may be shown explicitly.

Backhauling is accomplished over traditional communications infrastructure. The current art uses both wired (e.g., leased lines, copper, or fiber-optic cables) and wireless (e.g., microwave or satellite) connections.

According to the current art, installing a new base station requires the concomitant installation of backhauling infrastructure with its attendant costs and administrative issues. These costs and administrative issues can be considerable. For example, it may require laying cables, which often require governmental approvals and obtaining legal right-of-way through public or private property. In remote locations, the logistics for deploying a backhaul link may be prohibitively costly or difficult.

In the WiMAX field, for example, short-range base stations have been introduced. A similar approach can be used with any managed wireless network. A short-range BS is sometimes called a micro-base station or a pico-base station. These short-range, relatively inexpensive BSs have the potential to accelerate the penetration of WiMAX technology and expand the areas where it is available. However, a micro- or pico-base station must still be backhauled to a core network to provide connectivity to the Internet or other core network. Despite the relatively low cost of the short-range BS, the total deployment cost must take the cost of the backhaul link into account as well. As noted above, the cost of the backhaul link can be considerable—enough to preclude the deployment of a short-range base station in some cases.

The same applies to conventional, long-range base stations, as well, i.e., the costs associated with the requisite backhaul link may be sufficient to undermine the economic justification for deployment.

An alternative way to increase the coverage for a wireless communications network is to install a wireless repeater, rather than a new base station. A repeater is a device that boosts and amplifies the incoming radio signals and retransmits them over an extended area. In this sense, the repeater acts as an extension of the existing base station. As such, it does not require its own backhauling link. On the other hand, a repeater does not provide independent control. It simply replicates the policies of an existing base station.

SUMMARY OF THE INVENTION

The present inventors have observed that according to the current art, there are only two ways to extend the coverage of a wireless network: (1) deploy a new base station and pay the costs and administrative overhead of the requisite backhaul link, or (2) use a repeater and forego the ability to control and manage the extended area. Embodiments of the present invention provide apparatus and methods to overcome these limitations of the current art.

This disclosure describes apparatus and methods to permit the deployment of wireless base stations anywhere within broadcasting range of an appropriately configured existing base station. The backhauling of the newly deployed base station is accomplished in-band on the air interface normally used for subscriber communications with the existing base station using protocols that encapsulate backhaul communications within standard subscriber communication protocols. This type of backhauling is called "in-band Backhauling".

According to one aspect of the present invention there is provided a device for use in a wireless managed communication network, said device comprising (a) a first interface unit for interfacing with a first base station, said first interface unit providing a standard backhauling interface for backhauling from the first base station, and (b) a second interface unit for interfacing with a second base station, the second base station being configured to provide backhauling from and to the first base station and from and to a core network, such that the first and second interface units and the second base station jointly provide a channel for backhauling from the first base station.

According to another aspect of the present invention there is provided a first base station for use in a wireless managed communication network, said first base station comprising (a) a backhauling unit for providing a backhauling communication channel, and (b) an interface unit, associated with said backhauling unit and configured to communicate with a second base station, thereby to make said backhauling communication channel available to said second base station.

According to another aspect of the present invention there is provided an augmented base station for use in a managed wireless communications network, said augmented base station comprising (a) an in-band-backhauling device, and (b) a first base station for communicating with subscriber stations, wherein said in-band-backhauling device comprises (a) a first interface unit for interfacing with said first base station, said first interface unit providing a standard backhauling interface for backhauling from the first base station, and (b) a second interface unit for interfacing with a second base station, the second base station being configured to provide backhauling from and to the first base station, and from and to a core network, such that the first and second interface units and the second base station jointly provide a channel for backhauling from the first base station, and said first base station is further configured to communicate with a third base station, thereby to make said channel for backhauling available to said third base station.

According to another aspect of the present invention there is provided a method for controlling flow of traffic in a communication network, where said traffic includes messages of a first type encapsulated within messages of a second type, and said first type messages include at least one parameter defining control of said flow, said method comprising: examining a second type message to discern the contents of an encapsulated first type message, recognizing said parameter within the first type message, adjusting the flow of traffic in accordance with the parameter.

According to another aspect of the present invention there is provided a proxying device for proxying network elements in a communication network, said network operating with at least two protocol layers, said layers comprising a lower layer and a higher layer, said network comprising (a) a communication link between a first and a second linking unit, said linking units communicating at the higher protocol layer, (b) a first remote device connected to the first linking unit and communicating with said first linking unit according to the lower protocol layer, and (c) a second remote device connected to the second linking unit and communicating with said second linking unit according to the lower protocol layer, said first linking unit incorporating one of said proxying device, said proxying device configured to represent and act on behalf of said second remote device with respect to communications with the first remote device.

Unless otherwise defined, all technical and scientific terms and abbreviations used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
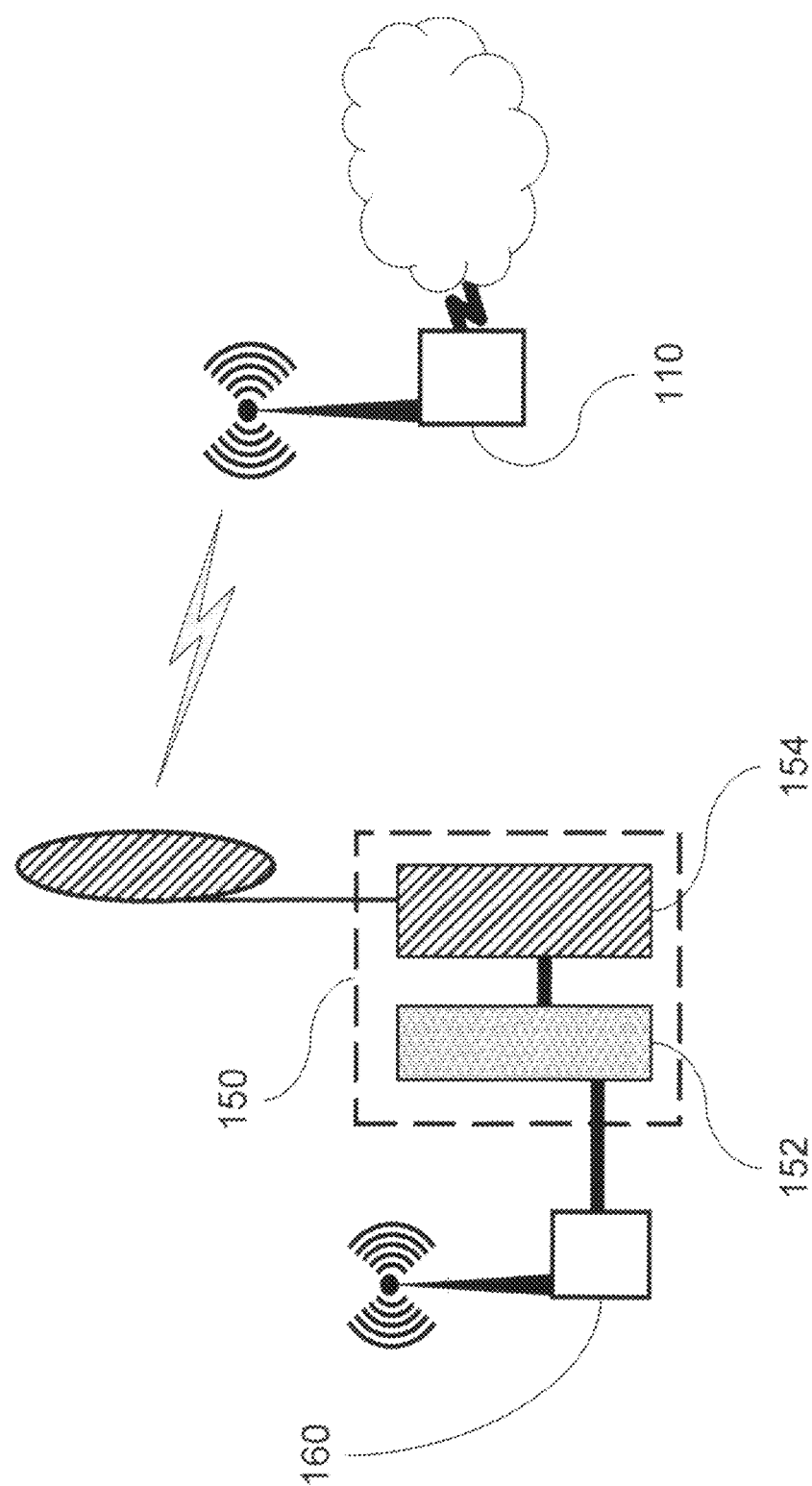
FIG. 1 is simplified block drawing showing the basic components of a Recipient Function Unit (RFU) for in-band Backhauling according to an embodiment of the present invention.

The present embodiments comprise apparatus and methods for
1. a Donor Function Unit (DFU), which is incorporated into an ordinary base station so that the base station becomes a Donor Base Station (DRS),
2. a Recipient Function Unit, a stand-alone module that communicates with one or more Remote Base Stations (RBS) on the one hand, and over an air interface with the DBS on the other hand, and
3. Various methods and protocols for communication between components of a network incorporating a DBS and RFU.

In short, a standard base station, backhauled to the communications network in a conventional fashion, is augmented with a Donor Function Unit (DFU) making it a Donor Base Station (DBS). The DFU communicates with one or more Remote Base Stations (RBS) through the agency of a stand-alone Recipient Function Unit (RFU).

The DFU and RFU are the two ends of a virtual backhaul link (also referred to as virtual channel, virtual segment, and virtual pipe) from the DBS to the RFU. This virtual backhaul link is also referred to as an "in-band backhaul link" or "in-band backhaul segment" and the use of it is also referred to as "in-band backhauling". Additionally, a Remote Base Station connected through an in-band backhaul link is said to be "in-band-backhauled" or "selif-backhauled."

It should be noted that an RBS is a completely ordinary base station in every respect. It is distinguished as an RBS only by virtue of being connected to the network through the RFU. If it were not connected through an RFU, it would not be called an RBS.

The fact that the RBS is connected through an RFU is completely transparent to the RBS and its operation and functionality are unchanged. It is called a Remote BS in terms of its relative location in the network topology in the sense that it is more remote from the core network than the DBS serving the RBS. A Remote Base Station is also referred to as a "Peripheral Base Station."

The virtual backhaul link functions like an ordinary backhaul link and, from the perspective of both an RBS and the access components of the core network (e.g., an ASN Gateway, also called "ASN GW"), the virtual backhaul link is transparent. It is "virtual" in the sense that the DFU and RFU create it in-band vis-à-vis ordinary subscriber wireless communications (e.g., in-band R1 for WiMAX).

The structure and operation of the RFU and DFU are explained in greater detail below.

Note that an RBS may also have a traditional, fixed backhaul link, in which case it is in-band-backhauled only with respect to a link provided through the RFU and DBS.

It should also be noted that in some embodiments, the RBS and RFU may be constructed as a single, standalone device.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For convenience and ease of explanation, many of the embodiments discussed in this disclosure are described in terms of their application in a WiMAX network and using IP (Internet Protocol) or the Open Systems Interconnection Basic Reference Model ("OSI Reference Model" or "OSI Model"). The use of WiMAX, IP, and OSI Model terminology should not be construed as limiting the invention to embodiments within those domains. Rather the invention's applicability to any managed wireless network will be evident to one trained in the art and the use of the example terminology is only to aid the reader in understanding various aspects of the invention.

For example, the term "R6" is used to describe the interface and protocols for communication between a base station and an ASN gateway; however the invention applies equally to any embodiment of an interface and protocol for communicating between a base station and a core network through a network access component such as a gateway. Similarly, other WiMAX-related terms are used, but should be understood as examples only and not limiting to WiMAX embodiments.

Reference is now made to FIG. 1, which illustrates a simplified view of an RFU 150. An RFU is a device that performs two functions:

1) The RFU communicates with a DBS to jointly create a virtual backhaul link between the DBS and the RFU, and
2) The RFU communicates with one or more RBSs to provide a backhaul link connection between the RBS and the DBS using the virtual backhaul link.

In the presently described embodiment, the RFU 150 is connected to an RBS 160. The RBS 160 is a standard base station.

The RFU 150 comprises two interfaces. On the one hand, it provides to the RBS 160 a standard backhauling (BH) interface 152. The BH interface 152 (shown shaded) is connected to the RBS 160 in a standard way, including hard-wired or connected through any Layer 2 (L2) or Layer 3 (L3) (i.e., data link layer or network layer, respectively, per the OSI Reference Model) transport mechanism (e.g. by connecting the RBS to an L2/L3 cloud to which the RFU is also connected and establishing a connection between the RBS and the RFU). The BH interface 152 in the RFU 150 handles bidirectional backhaul communications and protocols for the RBS 160. On the other hand, the RFU 150 also includes a DBS air-interface 154 (shown with hatching) to communicate with a DBS 110. An attribute of the communication between the RFU's DBS air-interface 154 and the DBS 110 in the presently described embodiment is that the communications and protocols are consistent with those of an ordinary subscriber station using SS communications (e.g., R1 for WiMAX).

As part of its operation, the RFU encapsulates all backhaul communication data from an RBS within SS communication data before transmission to the DBS (and its inverse, i.e., de-encapsulation for received communication destined for an RBS). In the case of an embodiment for WiMAX, for example, all network reference points and interfaces (R6 and R8) would be encapsulated within R1.

Depending upon the embodiment, encapsulation may take place in the BH interface 152 or the DBS air interface 154 or in another component (not shown) of the RFU.

The encapsulation of communications between the RFU and the DBS provides the virtual backhaul link.

There may also be communications directly between the DBS and the RFU, for example when managing a hand-over of a mobile subscriber station (MS) between a DBS and an RBS.

Figure 2:
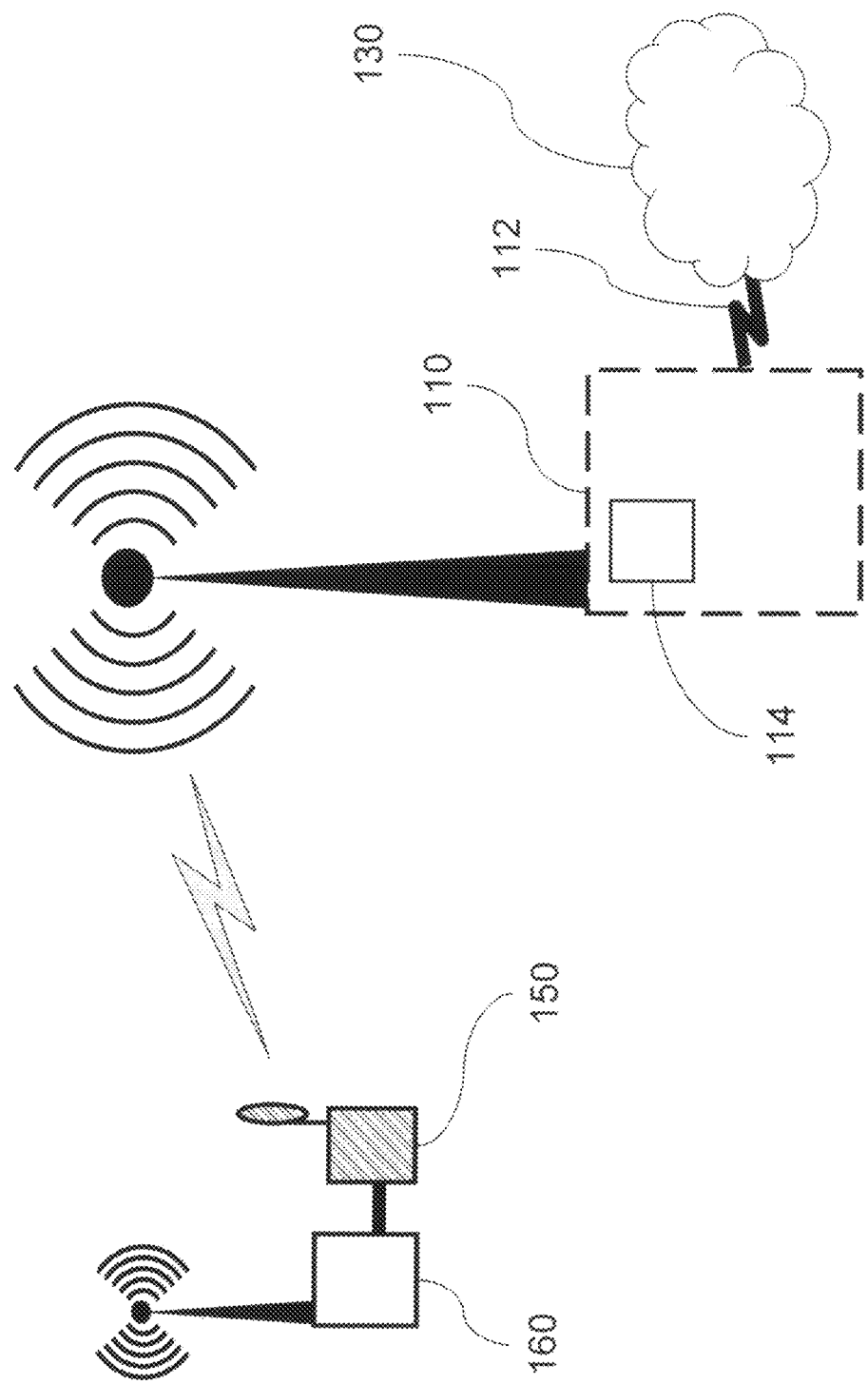
FIG. 2 is a simplified block drawing showing the basic components of a donor base station according to an embodiment of the present invention.

Reference is now made to FIG. 2, which illustrates certain features of the DBS 110. The DBS 110 is configured with a backhaul link 112 to a core network 130. As described above, the backhaul link 112 provides a connection ftom the DBS 110 to the network 130 and the backhaul link 112 carries traffic from the DBS 110 to the network 130 and from the network 130 to the DBS 110.

The DBS 110 also incorporates logic, in the form of a Donor Function Unit (DFU) 114 to handle communication from and to an RFU 150. In particular, one of the features of the DFU 114 is that it performs a function similar to that of the RFU 150. The DFU 114 receives encapsulated BH communications from the RFU 150 and de-encapsulates them for further transmission from the DBS 110 to the network 130. Correspondingly, the DFU 114 receives from the network backhaul communications that are destined for an RBS. The DFU 114 encapsulates the RBS-destined BH communications before transmission to the RFU 150.

Thus, the RFU and the DFU (within the DBS) create an in-band backhaul link and provide to the RBS a transparent backhauling channel to the network, obviating the need for additional backhaul infrastructure to connect the RBS to the network.

Figure 3:
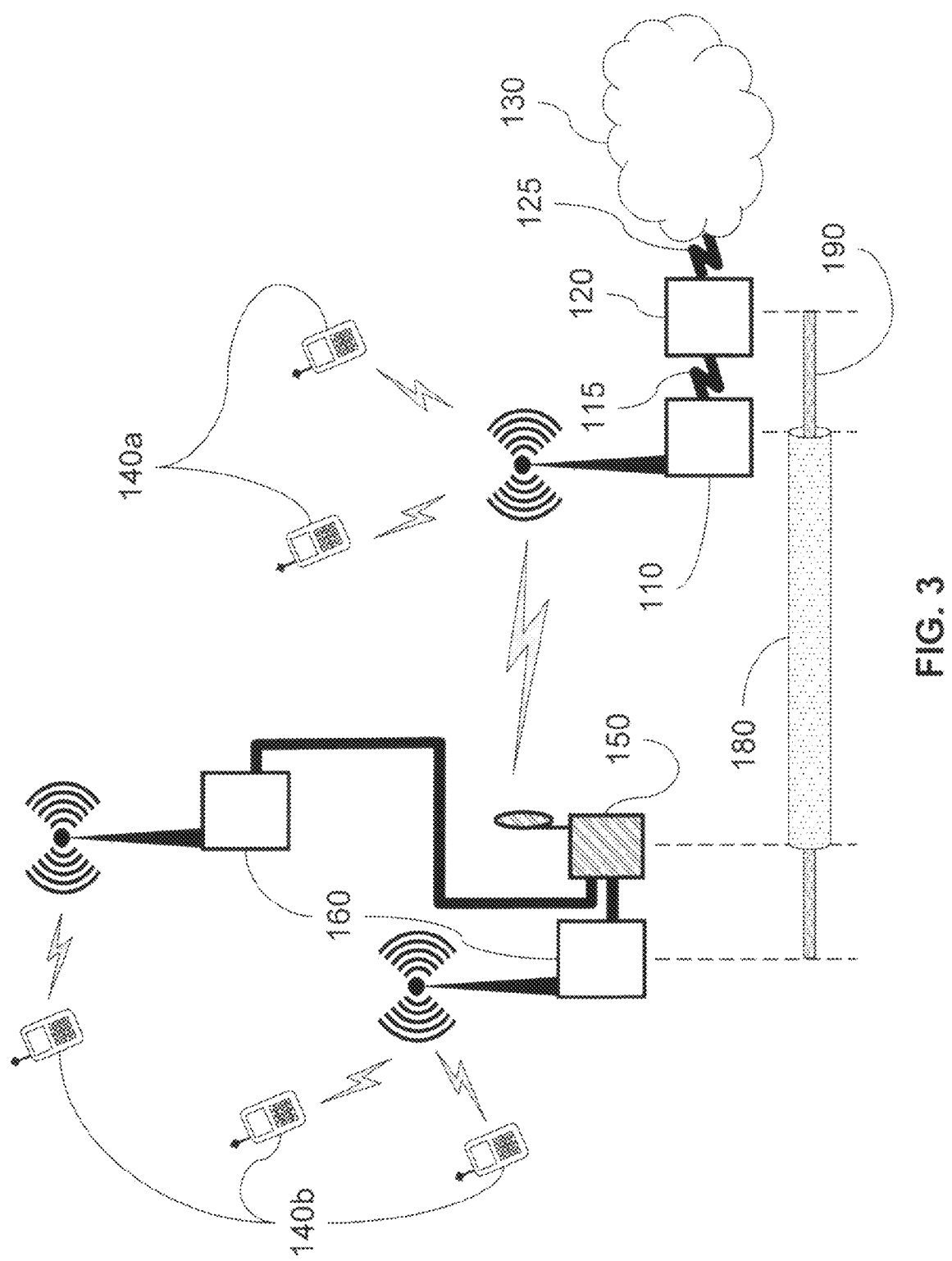
FIG. 3 is a simplified block diagram showing an overview of a wireless network comprising a donor base station and a remote base station, according to an embodiment of the present invention.

Reference is now made to FIG. 3, which illustrates a simplified view of a wireless network, including a Donor Base Station 110, Remote Base Stations (RBS) 160, a Recipient Function Unit (RFU) 150, mobile subscriber stations (MS) 140a and 140b, and a gateway 120 to a core network 130. In the presently described embodiment, the DBS 110, is backhauled via a link 115 to the gateway 120 and the gateway 120 is, in turn, connected via a link 125 to the network 130 (for example, this could be the Internet or a cellular communications network or any other network).

The DBS 110 communicates, in the usual fashion known in the art, with the network 130 to which it is backhauled. Similarly, the DBS 110 communicates with Subscriber Stations (SS) in the conventional fashion, such as the shown Mobile Subscriber stations (MS) 140a.

In addition, the DBS incorporates a Donor Function Unit (not shown, see description above) that enables it to provide in-band backhauling service to one or more Remote Base Stations 160. Such provision of backhauling service is described above.

In the illustrated embodiment, the RBS 160 is an ordinary base station (BS) connected to the Recipient Function Unit (RFU) 150. The RBS 160 communicates in the ordinary fashion known in the art for a backhauling connection with the RFU 150. Furthermore, it communicates in the usual fashion known in the art with SSs, such as the MSs 140b.

With respect to the RBS 160, the RFU 150 and the DBS 110 are both transparent, i.e., the RBS 160 communicates with the gateway 120 as though the RBS 160 were backhauled directly to the gateway in the conventional fashion. Similarly, with respect to the gateway 120, also, the DBS 110 and the RFU 150 are transparent.

With respect to the DBS 110, one aspect of the RFU 150 is that it operates as a special-purpose SS. Communication between the RFU 150 and the DBS 110 is carried out in the conventional fashion according to the appropriate embodiment (e.g., R1 for WiMAX).

For both the RBS 160 and the gateway 120, the existence of a virtual channel 180 is completely transparent. Each operates in blissful ignorance of the virtual channel's existence.

In other words, a feature of the RFU 150 and the DBS 110 is that they provide the virtual channel 180 for backhaul communications 190 through the RFU 150 and the DBS 110. As described above, the RFU 150 encapsulates outgoing backhaul communications within standard SS communication and de-encapsulates incoming backhaul communications. The DBS 110, for its part, provides the reciprocal functionality, encapsulating backhaul communications before transmitting to the RFU 150 and de-encapsulating communications received from the RFU 150 before transmitting them to the gateway 120. The immediately forementioned process creates the virtual channel 180 for providing a backhaul communications 190 between the RBS 160 and the gateway 120, as shown schematically in FIG. 3. This virtual channel 180 may be thought of as a virtual pipe, through which BH communications 190 flow in both directions. The overall effect is to create a virtual backhaul link for RBSs connected to the RFU 150.

Although the description above of FIG. 3 refers to several RBSs served by the RFU, in other embodiments a single RBS may be served by one RFU.

Also, although the description of the above-described embodiment is for a DBS connected directly to the backhauling infrastructure, in other embodiments, the DBS may itself be connected through an RFU, i.e. a DBS may be part of an RBS with respect to another DBS, creating one or more chains (of arbitrary length). For example, a simple chain would be DBS-RBS/DBS-RBS. Similarly, other configurations are possible and within the scope of the present disclosure, as will be understood by one trained in the art.

To gain a greater understanding of the presently described embodiments, following are some details of embodiments used for a WiMAX implementation. As noted, it should be understood that the basic principles, as described here, can be applied to any managed wireless network (such as, but not limited to, cellular telephone networks, HIPERMAN, and WiBro) to achieve similar results.

With respect to WiMAX-related embodiments, the following features are now described. As noted above, WiMAX and other embodiments are used as examples and are not intended to limit the scope of the disclosure.

1. R6 control delivery between an RBS and an ASN gateway.

2. R6 data path (or session) delivery between an RBS and an ASN gateway.

3. A data path (session) management extension between an RBS and a DBS.

4. Certain network addressing issues.

These aspects are described in the following sections.

Figure 4:
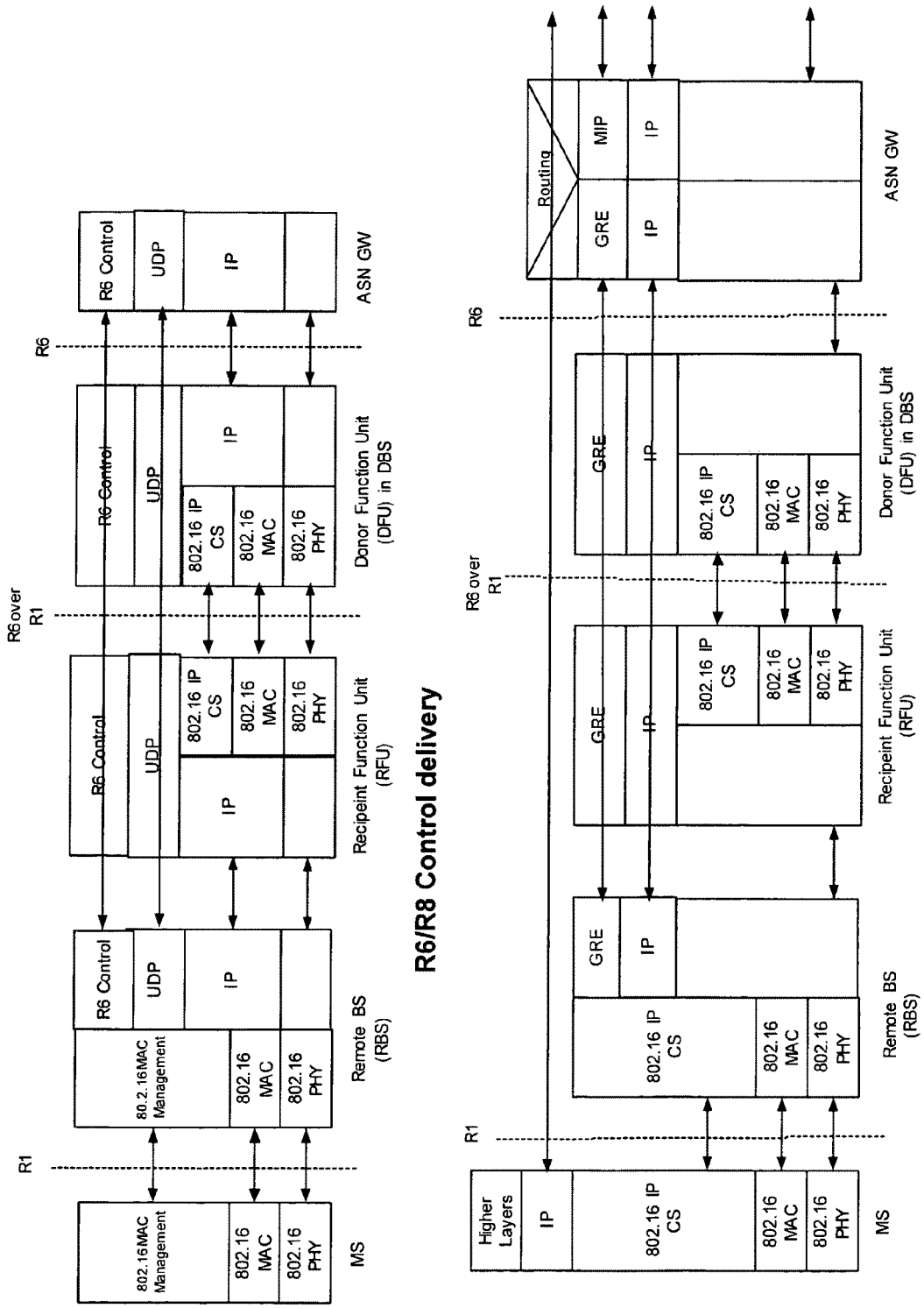
FIG. 4 shows an end-to-end protocol stack for R6/R8 control and R6 (GRE) user traffic according to a WiMAX embodiment of the present invention.

In FIG. 4 is shown the protocol stack for end-to-end R6/R8 control and R6 data path delivery respectively for a preferred embodiment. As shown in the figure, the RFU and the DBS's DFU operate on the indicated communications in the protocol stack (as indicated by the lines overlaying the respective layers in the stack of each unit). The communication between the RFU and the DBS accomplish "R6 over R1" communication, i.e., the R6, or network interface communication (e.g., between BS and ASN gateway) is transported between the RFU and the DBS using (i.e., encapsulated within) R1, which is an SS air interface protocol.

In the presently described embodiment, the R6 and R8 control messages, as well as R6 tunneling (e.g., GRE) of the user's traffic is encapsulated within an R1 data connection. The encapsulation includes a BH header and the R6 control message. The BH header comprises, at a minimum, source and destination identifiers (e.g., BS and gateway).

According to a feature of the presently described embodiment, there is mapping of a bearer data stream on a dedicated R1 data connection according to quality of service (QoS) attributes. When considering QoS attributes, the BH header may also include Session ID (e.g., GRE Key) and may replicate sequence numbering from the GRE header (for data integrity support).

Figure 5:
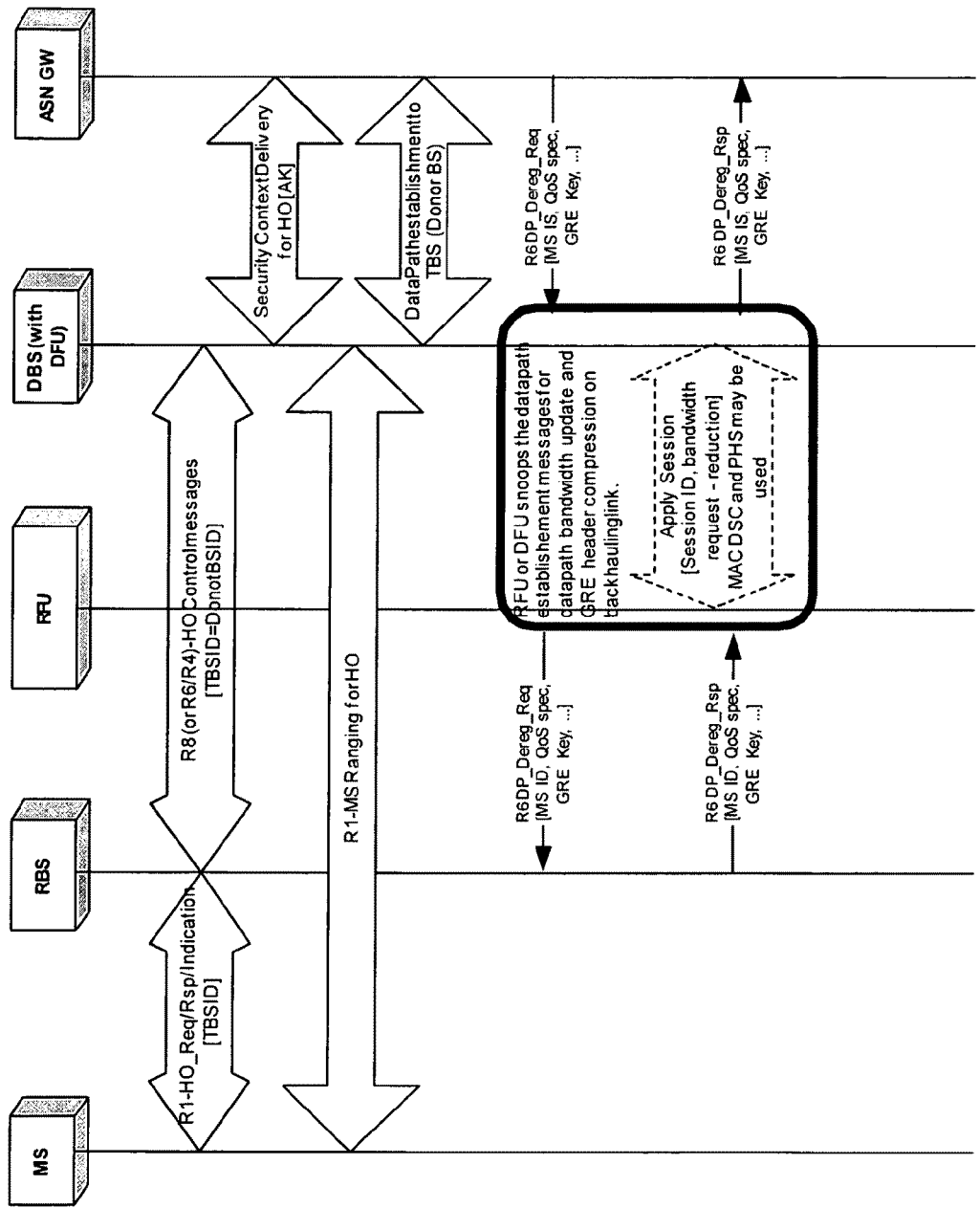
FIG. 5 illustrates additions made to a standard inter-BS handover (also known as "handoff") process from a Remote Base Station to a Donor Base Station according to an embodiment of the present invention.
Figure 6:
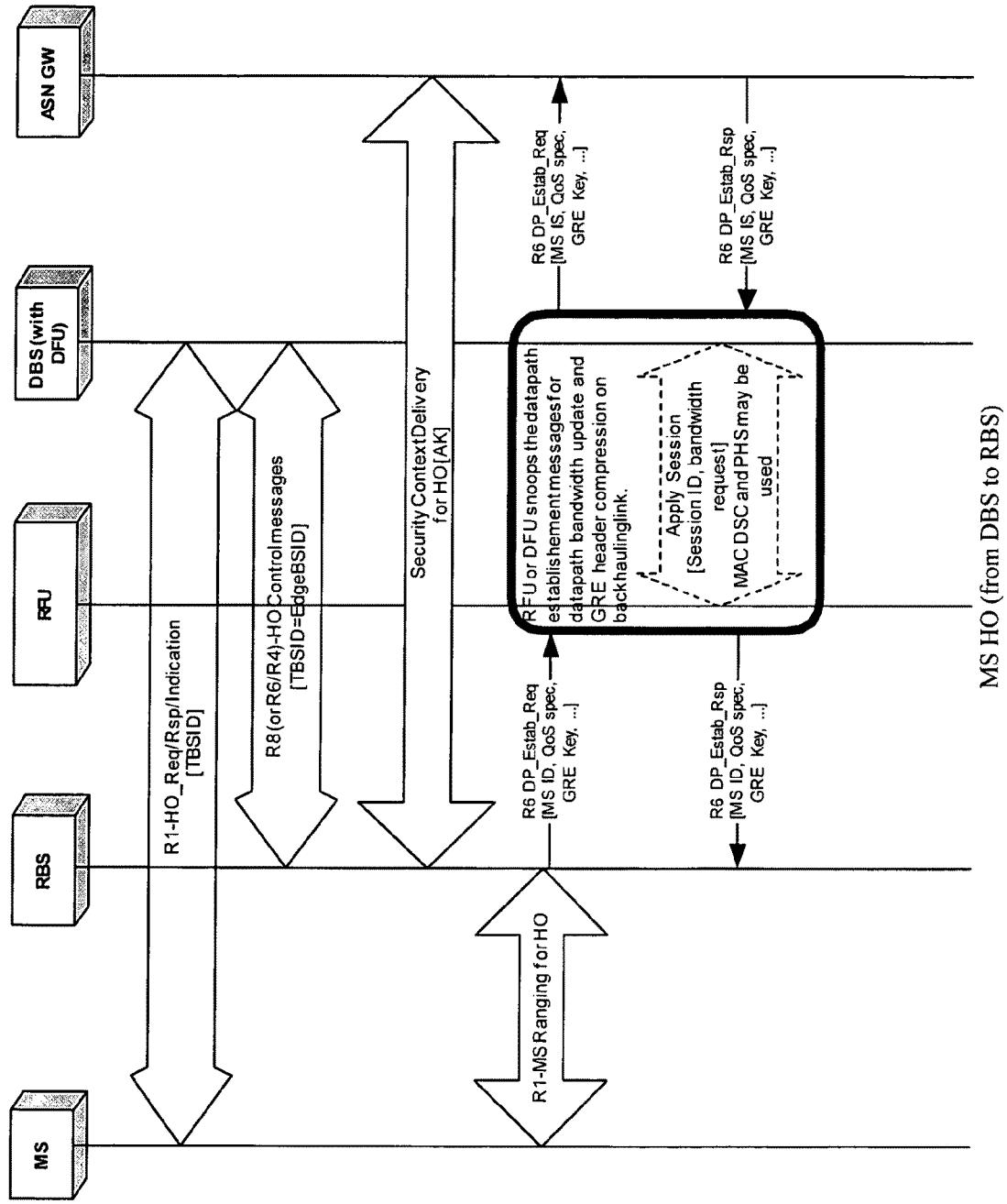
FIG. 6 illustrates additions made to a standard inter-BS handover process, from a Donor Base Station to a Remote Base Station according to an embodiment of the present invention.
Figure 8:
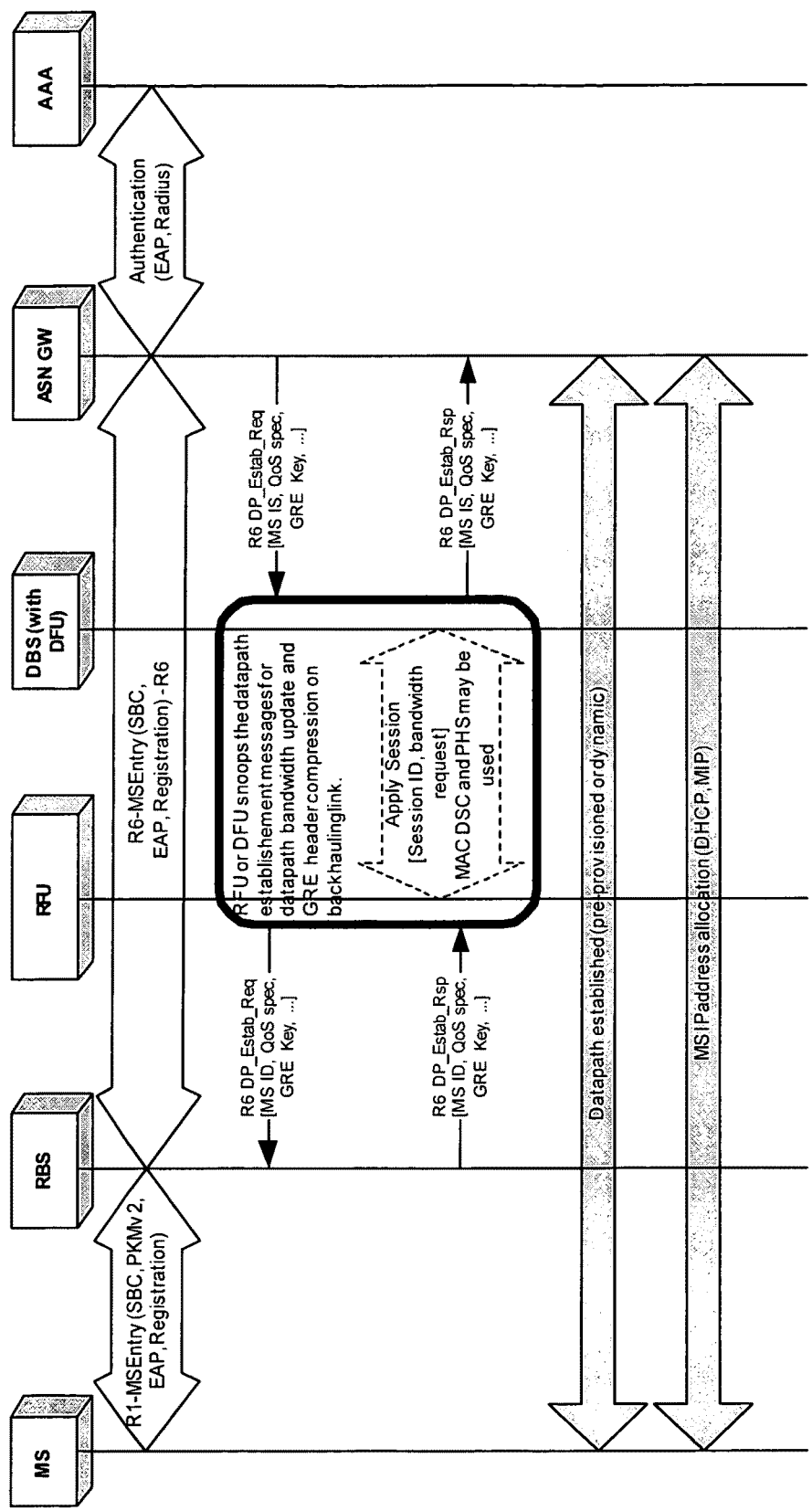
FIG. 8 shows an initial network entry procedure of a mobile subscriber to a Remote Base Station, including special handling between an RFU and a Donor Base Station (DBS) according to an embodiment of the present invention.

According to another feature of the presently described embodiment, there is provided session management negotiation between the RFU and the DBS. This negotiation includes establishment and release of an SS (e.g., an MS). and its sessions. For example, this negotiation may be based on an extension of the 802.16e MAC standard. Examples of the negotiation for establishment and release of a session are shown in FIG. 5, FIG. 6, and FIG. 8. In the figure is shown an example for the RFU initiating the establishment and release of a session. It should be noted, however, that the DBS may also initiate establishment and release of a session. It should also be noted, that either the DBS or RFU may apply policies during the negotiation. The policies may include, but are not limited to, various QoS parameters for a specific service flow. The QoS parameters may include, for example, change of rate and delay.

Though not required, for purposes of efficiency from a radio perspective, it is also possible to use a single CID (connection ID) for multiple users and sessions.

Both the RFU and the DBS may incorporate IP address resolution in order to reconstruct the IP header of the control and data packets. The address resolution is based on various bindings resulting from the BH layer as described above.

Another feature of the presently described embodiment is that it supports header compression according to the methods known in the art (e.g., standard WiMAX header compression).

As noted earlier, an advantage of the present embodiment is the ability to manage SS load between a DBS and one or more operatively connected RBSs. FIG. 5 shows an example of an MS handover (HO) procedure from an RBS (acting as the Serving BS) to a DBS (acting as Target BS) according to a preferred embodiment.

FIG. 6 shows the handover in the other direction (from DBS to RBS). The handover process is similar to the regular inter-BS handover process, with the exception of there being additional operations between the RFU and DFU, as shown in the figure. Note that the RFU and DFU may snoop the message traffic to identify relevant parameters, examples of which are described in FIG. 5 and FIG. 6 illustrating handover in each direction.

Figure 7:
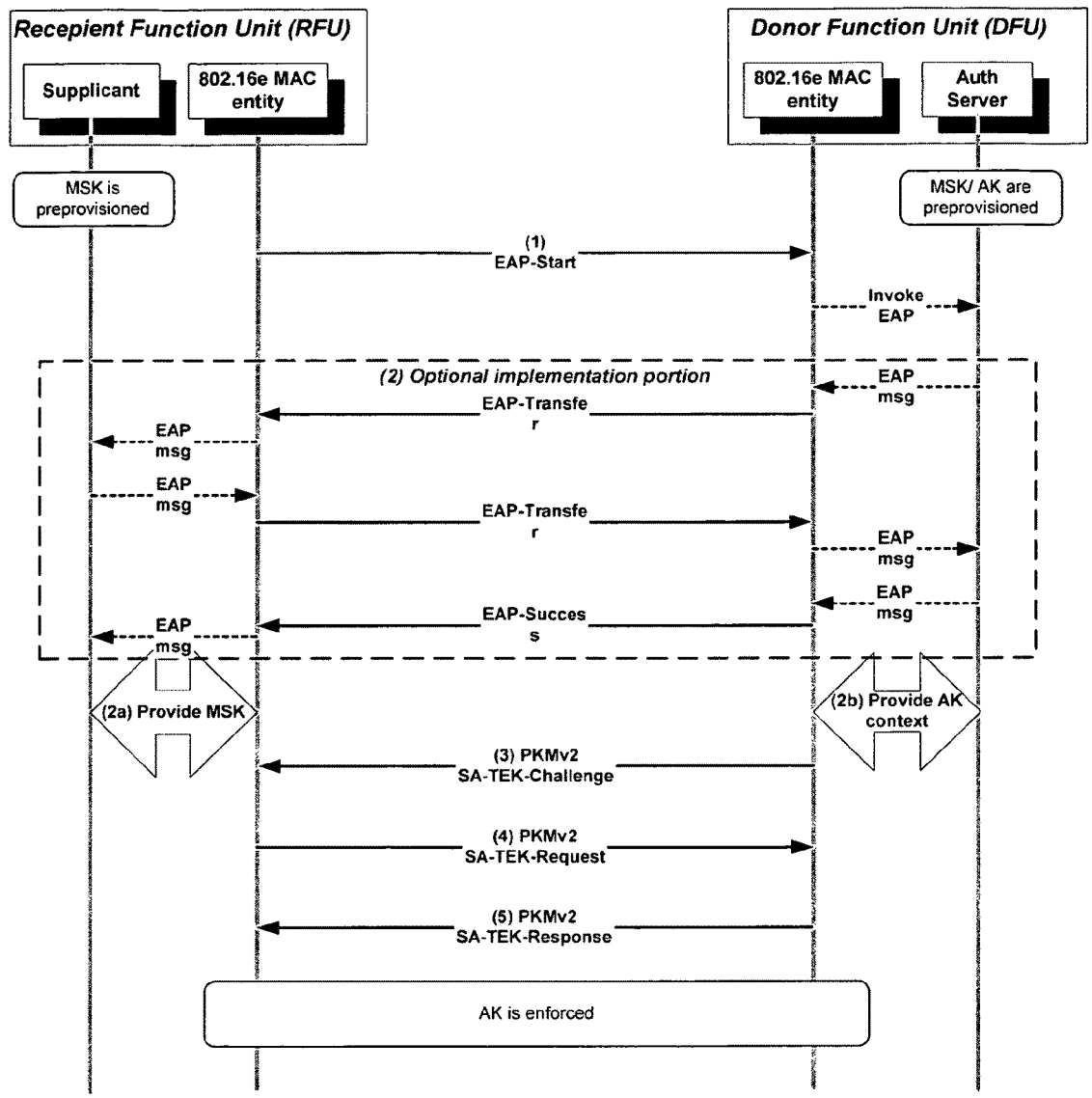
FIG. 7 shows a network entry procedure for a Recipient Function Unit according to an embodiment of the present invention.

Attention is now drawn to FIG. 7, which shows a network entry procedure for a Recipient Function Unit according to an embodiment of the present invention. The procedure describes entry (also called "installation") and authorization of an RFU in the network. The present embodiment assumes that an operator may install the RFU under any DFU in its network.

The Donor BS shown in the present embodiment may be any Serving BS (e.g. a WiMAX BS), with the additional capabilities provided by a DFU as described in this disclosure.

The process illustrated in FIG. 7 may include some of the features enumerated in the following list. Again, it should be noted that these are described in terms of a WiMAX implementation by way of example only and should not be construed as limiting.

The RFU may use a dummy or a real authentication method with EAP/PKMv2. The authentication is not exposed to the rest of the WiMAX network (ASN GW, AAA (Authentication, Authorization & Accounting Server, which is used for the authorization and authentication of the subscriber into the network and service)), as shown in FIG. 7.

The RFU uses an authenticated mode for entering the network, however the DFU intercepts the authentication process so that the RFU Network Entry is not exposed to the ASN Gateway). In a possible implementation of the authentication process both sides (DFU and RFU) are preconfigured with a MSK (Master Session Key) to be used for deriving other security context (as per 802.16e).

The DFU may identify the RFU using an indication during INE (Initial Network Entry). As an example, the DFU may be pre-provisioned with an RFU's MS ID (MAC address) to distinguish the RFU from other devices (e.g., MS).

Both sides may support traffic encryption and CMAC for security purposes.

Both sides may establish two types of bi-directional datapaths (CIDs): one type for control traffic (R6/R8 control) and a second one for user traffic (e.g., GRE encapsulation).

As noted above, header compression may be supported.

RBS management traffic may also be delivered—classified to dedicated CIDs between the RFU and the DFU.

Another feature of embodiments of the present invention concerns the RBS (IP host) address allocation. With respect to this feature, in some embodiments, the following rules may apply:

RBS IP address allocation is the same as for any other BS in the network.

RBS IP address is from the same IP space as other ASN elements (e.g., BSs, ASN GW).

In the case of ASN bridging transport (L2), DBS and all RFUs attached to this Donor BS are assigned to the same IP subnet.

Attention is now drawn to FIG. 8, which shows an initial network entry procedure of a mobile subscriber to a Remote Base Station, including special handling between an RFU and DBS according to an embodiment of the present invention. Note that the RFU and DFU may snoop the message traffic to identify relevant parameters, examples of which are described in the figure.

Some factors to note with regard to network entry, handoff SF (service flow) management, and deregistration procedures may include the following DFU and/or RFU may snoop or relay R6 datapath messages (e.g., Establishment/Deregistration/Modify) in order to derive Session ID (GRE Key) and QoS parameters of the flow running through an in-band backhauling segment. When snooping discovers parameters that are intended to affect the R6 datapath control, such parameters may be mapped to their corresponding R1 datapath control parameters, thereby supplying the desired relative flow as specified in the encapsulated R6 datapath control messages.

Session ID (GRE Key) information may be used for two purposes by DFIJ and/or RFU:
 To utilize the in-band backhauling segment by compressing the GRE header on the air (i.e., in-band backhauling segment).
 To keep the session context per Session ID for bandwidth management Other R6/R8 control messages might not be intercepted by the DFU and/or RFU.

In some embodiments of the in-band-backhauling segment, the following bandwidth and QoS management mechanisms may be applied. These examples are taken from WiMAX implementations, but should not be considered as limiting to that domain. The following mechanisms may be used to improve the utilization of the in-band-backhauling traffic (i.e., improve the use of the in-band BH segment's capacity) and reducing control latencies.

To optimize user traffic utilization it is possible (though not required) to use shared CIDs (Connection IDs) for users/SFs (MSs/GRE Keys). It is also possible to use a dedicated CID per SF. In some embodiments, for example, an RBS may serve many MSs, where each MS may have multiple Service Flows (SFs). By using shared CIDs, the system does not expose to the in-band virtual BH segment all the SFs, but maps them to a limited number of connections (CIDs) of the R1 interface. This use of shared CIDs provides greatly improved utilization of the in-band BH segment as it dramatically reduces the number of the managed CIDs (e.g., can replace tens of CIDs by three to five pairs).

For bandwidth management each R6 datapath event (as described above) may include bandwidth reservation information.

In order to reduce control relay time, a DBS can enable higher priority to control messages (e.g., provide a dedicated CID for R6/R8 control).

DBS and RFU may also apply QoS policies based on the TOS (Type of Service) marking of the MS-traffic outer header.

With regard to network planning, an embodiment of an in-band backhauling system may use various models to enable traffic forwarding between the elements within an ASN (Access Service Network) in a WiMAX system, for example.

When a DBS and RFU are connected via WiMAX, only an L3 connection exists between them. In such a case, the DBS and RFU must each provide functionality similar to that provided by Proxy ARP (Address Resolution Protocol). Ordinary Proxy ARP cannot be used in this case, due to the lack of a continuous L2 connection between elements of the core network and the RBSs served by the RFU (i.e., as noted there is only an L3 connection). To address this problem, the RFU can proxy for elements in the core network vis-à-vis the RBSs and the DBS can proxy for the connected RBSs vis-à-vis the core network elements.

For example, if an RBS needs to send a packet to the ASN gateway, it would send an ARP request asking for the MAC address corresponding to the ASN GW's IP address. Ordinarily, the ASN GW would respond, but in the example cited here, it cannot due to the lack of a continuous L2 connection. Therefore, the RFU intercepts and replies with its own MAC address and, using the virtual link, the RFU handles delivering the packet to the ASN GW. A similar procedure would apply for the other direction with the DBS proxying for the RBS vis-à-vis the ASN GW.

Another possible embodiment is the use of ASN Relay functionality (as specified by the WiMAX NWG (Network Working Group)). In such embodiments, the RFU and DFU are used as ASN Relays for the RBS and ASN gateway respectively.

An in-band-backhauled base station is an RBS backhauled through an RFU and a DBS as described in this disclosure. Such a base station may provide at least some of the following advantages:

1. Economic: the costs for base station backhauling infrastructure using the means available according to the prior art, such as a hardwired connection, are avoided.
2. Simplicity of deployment: Extending a wireless network with additional base stations may be accomplished without the cost and time considerations of construction, wiring, and administrative overhead (e.g., for obtaining legal right-of-way for communication lines), etc.
3. Network management: Each RBS is an ordinary base station that may be managed like any other base station, applying policies appropriate for that base station. For example, Company A may come to an agreement to in-band-backhaul an RBS through a DBS at company B. Each company can manage its respective base station according to each company's policies—such management would be impossible with a repeater.
4. Flexibility: A DBS can self-manage its load by delegating (i.e., handing off its SSs to its RBSs for overlapping areas of coverage. This can also improve performance by eliminating the bottleneck that could otherwise occur at a base station augmented by repeaters.
5. Performance: By using additional BSs with the RFU, processing that is latency sensitive (e.g., scheduling, ARQ handling) can be handled locally by the RBS, thus reducing latency and improving the user experience for SSs.
6. Coverage: Often there are isolated areas within the coverage area of a wireless base station where communication is not reliable. The lack of reliability may be due, for example, to topographic features or other obstructions, such as buildings. The deployment of an in-band-backhauled base station can address this coverage problem and increase the capacity of the wireless network.

It is expected that during the life of this patent many relevant devices and systems will be developed and the scope of the terms herein, particularly of the terms backhauling, gateway, base station, subscriber station, mobile subscriber, serving base station, target base station, all WiMAX-specific terminology and examples, all Internet Protocol terminology and examples, and all OSI Reference Model terminology and examples, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for providing in-band backhauling from a first base station to a second base station in a wireless communication network, said method comprising:
connecting a device to a first base station, said device comprising:
a) a backhauling interface unit for physically connecting to and interfacing with said first base station using a standard backhaul interface and a standard backhaul protocol to and from the first base station, said backhauling interface unit comprising logic for providing a standard backhauling interface for backhauling from the first base station, and
b) an air interface unit for connecting to said first backhauling interface unit, comprising logic for
encapsulating, within a subscriber station communications protocol, backhaul communications in the standard backhaul protocol received from said backhauling interface unit,
for wirelessly transmitting the encapsulated backhaul communications to a second base station, the second base station being configured to provide backhauling from and to the first base station and from and to a core network, and de-encapsulating backhaul communications received from the second base station in the subscriber station communications protocol, wherein the backhauling interface unit, the air interface unit and the second base station jointly provide a channel for backhauling from the first base station.

2. The method of claim 1 and further comprising using the device for:

receiving encapsulated backhaul communications from the second base station; and de-encapsulating the encapsulated backhaul communications received from the second base station.

3. The method of claim 1 in which the encapsulating backhaul communications comprises encapsulation at standard network layer 2.

4. The method of claim 1 in which the encapsulating backhaul communications comprises encapsulation at standard network layer 3.

* * * * *